(12) United States Patent
Robertson et al.

(10) Patent No.: US 7,865,925 B2
(45) Date of Patent: *Jan. 4, 2011

(54) OPTIMIZATION OF A FULL DUPLEX WIDEBAND COMMUNICATIONS SYSTEM

(76) Inventors: Neil C. Robertson, 757 Huntington Way, Lilburn, GA (US) 30047; Jose M. Fernandez, 971 Cedar Bluff Trail, Lilburn, GA (US) 30047

(*) Notice: Subject to any disclaimer, the term of this patent is extended or adjusted under 35 U.S.C. 154(b) by 0 days.

This patent is subject to a terminal disclaimer.

(21) Appl. No.: 12/331,570

(22) Filed: Dec. 10, 2008

(65) Prior Publication Data

US 2009/0083819 A1  Mar. 26, 2009

Related U.S. Application Data (63) Continuation of application No. 10/923,948, filed on Aug. 23, 2004, now Pat. No. 7,487,532, and a continuation of application No. 10/342,670, filed on Jan. 15, 2003.

(51) Int. Cl.
 *H04N 7/18* (2006.01)
(52) U.S. Cl. ............................. 725/78; 725/80; 725/85; 370/276; 370/295; 370/437
(58) Field of Classification Search .................. 725/91, 725/111, 126; 709/227; 375/222, 224; 455/135
See application file for complete search history.

(56) References Cited

U.S. PATENT DOCUMENTS

| | | |
|---|---|---|
| 4,215,366 A | 7/1980 | Davidson |
| 4,290,081 A | 9/1981 | Foerster |
| 4,439,784 A | 3/1984 | Furukawa et al. |
| 4,535,355 A | 8/1985 | Arn et al. |
| 4,540,958 A | 9/1985 | Neyens et al. |
| 4,578,533 A | 3/1986 | Pierce |
| 4,644,526 A | 2/1987 | Wu |
| 4,686,564 A | 8/1987 | Masuko et al. |
| 4,706,121 A | 11/1987 | Young |
| 4,751,578 A | 6/1988 | Reiter et al. |
| 4,885,803 A | 12/1989 | Hermann et al. |
| 4,908,713 A | 3/1990 | Levine |
| 4,916,532 A | 4/1990 | Streck et al. |

(Continued)

FOREIGN PATENT DOCUMENTS

EP  0107600 A1  5/1984

(Continued)

*Primary Examiner*—Christopher Kelley
*Assistant Examiner*—Timothy R Newlin
(74) *Attorney, Agent, or Firm*—Merchant & Gould (57) ABSTRACT

Systems and methods are disclosed for a full duplex wideband communications system for a local (e.g., in-home) coaxial network. The system employs a Frequency-division duplex (FDD) scheme that allows identical wideband modems to communicate with each other. To achieve this, the wideband modems contain a duplexer and a switch that allows reversing the connection of the wideband transmitter and receiver to the duplexer. Each wideband modem includes a control modem that is used to control access to the wideband channels. A wideband transmitter, which may be included in a modem associated with a server set-top terminal (STT), transmits a video presentation to a wideband receiver, which may be included in a modem associated with a client STT.

6 Claims, 5 Drawing Sheets

U.S. PATENT DOCUMENTS

| | | |
|---|---|---|
| 4,963,994 A | 10/1990 | Levine |
| 4,963,995 A | 10/1990 | Lang |
| 5,010,299 A | 4/1991 | Nishizawa et al. |
| 5,010,399 A | 4/1991 | Goodman et al. |
| 5,038,211 A | 8/1991 | Hallenbeck |
| 5,048,054 A | 9/1991 | Eyuboglu et al. |
| 5,251,074 A | 10/1993 | Hamma et al. |
| 5,253,066 A | 10/1993 | Vogel |
| 5,293,357 A | 3/1994 | Hallenbeck |
| 5,406,626 A | 4/1995 | Ryan |
| 5,412,416 A | 5/1995 | Nemirofsky |
| 5,479,268 A | 12/1995 | Young et al. |
| 5,481,542 A | 1/1996 | Logston et al. |
| 5,508,815 A | 4/1996 | Levine |
| 5,515,377 A | 5/1996 | Horne et al. |
| 5,524,051 A | 6/1996 | Ryan |
| 5,568,272 A | 10/1996 | Levine |
| 5,574,964 A | 11/1996 | Hamlin |
| 5,579,308 A | 11/1996 | Humpleman |
| 5,590,195 A | 12/1996 | Ryan |
| 5,600,364 A | 2/1997 | Hendricks et al. |
| 5,600,573 A | 2/1997 | Hendricks et al. |
| 5,600,707 A | 2/1997 | Miller, II |
| 5,621,793 A | 4/1997 | Bednarek et al. |
| 5,638,423 A | 6/1997 | Grube et al. |
| 5,666,151 A | 9/1997 | Kondo et al. |
| 5,682,206 A | 10/1997 | Wehmeyer et al. |
| 5,699,105 A | 12/1997 | Chen et al. |
| 5,701,383 A | 12/1997 | Russo et al. |
| 5,708,961 A | 1/1998 | Hylton et al. |
| 5,714,945 A | 2/1998 | Sakuma et al. |
| 5,715,020 A | 2/1998 | Kuroiwa et al. |
| 5,715,277 A | 2/1998 | Goodson et al. |
| 5,751,806 A | 5/1998 | Ryan |
| 5,758,257 A | 5/1998 | Herz et al. |
| 5,774,527 A | 6/1998 | Handelman et al. |
| 5,787,472 A | 7/1998 | Dan et al. |
| 5,793,413 A | 8/1998 | Hylton et al. |
| 5,793,414 A | 8/1998 | Shaffer |
| 5,796,442 A | 8/1998 | Gove et al. |
| 5,808,659 A | 9/1998 | Coutinho et al. |
| 5,809,204 A | 9/1998 | Young et al. |
| 5,828,403 A | 10/1998 | DeRodeff et al. |
| 5,835,128 A | 11/1998 | Macdonald et al. |
| 5,851,149 A | 12/1998 | Xidos et al. |
| 5,867,485 A | 2/1999 | Chambers et al. |
| 5,872,644 A | 2/1999 | Yamazaki et al. |
| 5,886,732 A | 3/1999 | Humpleman |
| 5,886,753 A | 3/1999 | Shinyagaito et al. |
| 5,915,068 A | 6/1999 | Levine |
| 5,920,801 A | 7/1999 | Thomas et al. |
| 5,930,247 A | 7/1999 | Miller, II et al. |
| 5,936,660 A | 8/1999 | Gurantz |
| 5,940,073 A | 8/1999 | Klosterman et al. |
| 5,940,387 A | 8/1999 | Humpleman |
| 5,970,386 A | 10/1999 | Williams |
| 5,983,068 A | 11/1999 | Tomich et al. |
| 5,990,927 A | 11/1999 | Hendricks et al. |
| 5,995,258 A | 11/1999 | Weber et al. |
| 6,005,861 A | 12/1999 | Humpleman |
| 6,014,546 A | 1/2000 | Georges et al. |
| 6,026,150 A | 2/2000 | Frank et al. |
| 6,037,998 A | 3/2000 | Usui et al. |
| 6,055,355 A | 4/2000 | Lee |
| 6,061,449 A | 5/2000 | Candelore et al. |
| 6,073,122 A | 6/2000 | Wool |
| 6,091,320 A | 7/2000 | Odinak |
| 6,100,936 A | 8/2000 | Jordan et al. |
| 6,118,873 A | 9/2000 | Lotspiech et al. |
| 6,151,493 A | 11/2000 | Sasakura et al. |
| 6,169,543 B1 | 1/2001 | Wehmeyer |
| 6,172,712 B1 | 1/2001 | Beard |
| 6,181,784 B1 | 1/2001 | Duran et al. |
| 6,182,287 B1 | 1/2001 | Schneidewend et al. |
| 6,215,526 B1 | 4/2001 | Barton et al. |
| 6,219,839 B1 | 4/2001 | Sampsell |
| 6,233,389 B1 | 5/2001 | Barton et al. |
| 6,240,555 B1 | 5/2001 | Shoff et al. |
| 6,243,142 B1 | 6/2001 | Mugura et al. |
| 6,263,503 B1 | 7/2001 | Margulis |
| 6,285,746 B1 | 9/2001 | Duran et al. |
| 6,286,140 B1 | 9/2001 | Ivanyi |
| 6,286,142 B1 | 9/2001 | Ehreth |
| 6,299,895 B1 | 10/2001 | Hammang et al. |
| 6,305,017 B1 | 10/2001 | Satterfield |
| 6,310,886 B1 | 10/2001 | Barton |
| 6,317,884 B1 | 11/2001 | Eames et al. |
| 6,324,338 B1 | 11/2001 | Wood et al. |
| 6,327,418 B1 | 12/2001 | Barton |
| 6,330,334 B1 | 12/2001 | Ryan |
| 6,353,929 B1 | 3/2002 | Houston |
| 6,377,782 B1 | 4/2002 | Bishop et al. |
| 6,415,031 B1 | 7/2002 | Colligan et al. |
| 6,418,558 B1 | 7/2002 | Roberts et al. |
| 6,421,706 B1 | 7/2002 | McNeill et al. |
| 6,424,947 B1 | 7/2002 | Tsuria et al. |
| 6,442,755 B1 | 8/2002 | Lemmons et al. |
| 6,452,923 B1 | 9/2002 | Gerszberg et al. |
| 6,481,013 B1 | 11/2002 | Dinwiddie et al. |
| 6,483,548 B1 | 11/2002 | Allport |
| 6,493,875 B1 | 12/2002 | Eames et al. |
| 6,496,980 B1 | 12/2002 | Tillman et al. |
| 6,505,348 B1 | 1/2003 | Knowles et al. |
| 6,526,581 B1 | 2/2003 | Edson |
| 6,530,085 B1 | 3/2003 | Perlman |
| 6,535,717 B1 | 3/2003 | Matsushima et al. |
| 6,536,041 B1 | 3/2003 | Knudson et al. |
| 6,542,610 B2 | 4/2003 | Traw et al. |
| 6,567,981 B1 | 5/2003 | Jeffrey |
| 6,578,070 B1 | 6/2003 | Weaver et al. |
| 6,588,017 B1 | 7/2003 | Calderone |
| 6,594,798 B1 | 7/2003 | Chou et al. |
| 6,614,936 B1 | 9/2003 | Wu et al. |
| 6,622,304 B1 | 9/2003 | Carhart |
| 6,622,307 B1 | 9/2003 | Ho |
| 6,637,031 B1 | 10/2003 | Chou |
| 6,681,326 B2 | 1/2004 | Son et al. |
| 6,697,426 B1 | 2/2004 | Van Der Schaar et al. |
| 6,697,489 B1 | 2/2004 | Candelore |
| 6,704,028 B2 | 3/2004 | Wugofski |
| 6,711,132 B2 | 3/2004 | Lazarus |
| 6,735,221 B1 | 5/2004 | Cherubini |
| 6,735,312 B1 | 5/2004 | Abdalla et al. |
| 6,757,906 B1 | 6/2004 | Look et al. |
| 6,766,526 B1 | 7/2004 | Ellis |
| 6,771,908 B2 | 8/2004 | Eijk et al. |
| 6,789,106 B2 | 9/2004 | Eyer et al. |
| 6,791,995 B1 | 9/2004 | Azenkot et al. |
| 6,795,205 B1 | 9/2004 | Gacek |
| 6,804,357 B1 | 10/2004 | Ikonen et al. |
| 6,816,194 B2 | 11/2004 | Zhang et al. |
| 6,864,778 B2 | 3/2005 | Musschelbroeck et al. |
| 6,868,292 B2 | 3/2005 | Ficco et al. |
| 6,870,570 B1 | 3/2005 | Bowser |
| 6,889,385 B1 | 5/2005 | Rakib et al. |
| 6,904,522 B1 | 6/2005 | Benardeau et al. |
| 6,915,529 B1 | 7/2005 | Suematsu et al. |
| 6,930,788 B1 | 8/2005 | Iwamoto et al. |
| 6,957,344 B1 | 10/2005 | Goldshlag et al. |
| 6,996,837 B1 | 2/2006 | Miura et al. |
| 7,020,890 B1 | 3/2006 | Suematsu et al. |
| 7,047,305 B1 | 5/2006 | Brooks et al. |
| 7,054,289 B1 | 5/2006 | Foster, Jr. et al. |
| 7,093,295 B1 | 8/2006 | Saito |

| | | | | | | |
|---|---|---|---|---|---|---|
| 7,127,734 | B1 | 10/2006 | Amit | 2003/0181160 A1 | 9/2003 | Hirsch |
| 7,139,398 | B2 | 11/2006 | Candelore et al. | 2003/0202772 A1 | 10/2003 | Dow et al. |
| 7,140,033 | B1 | 11/2006 | Durden et al. | 2003/0204856 A1 | 10/2003 | Buxton |
| 7,146,628 | B1 | 12/2006 | Gordon et al. | 2003/0207672 A1 | 11/2003 | Dang et al. |
| 7,155,012 | B2 | 12/2006 | Candelore et al. | 2003/0233667 A1 | 12/2003 | Umipig et al. |
| 7,184,550 | B2 | 2/2007 | Graunke | 2004/0028216 A1 | 2/2004 | Freyman |
| 7,190,901 | B2 | 3/2007 | Farmer et al. | 2004/0032902 A1 | 2/2004 | Koifman et al. |
| 7,209,667 | B2 | 4/2007 | Lindblad | 2004/0032950 A1 | 2/2004 | Graunke |
| 7,222,358 | B2 | 5/2007 | Levinson et al. | 2004/0034874 A1 | 2/2004 | Hord et al. |
| 7,233,669 | B2 | 6/2007 | Candelore | 2004/0040035 A1 | 2/2004 | Carlucci et al. |
| 7,260,829 | B1 | 8/2007 | Hendricks et al. | 2004/0051638 A1 | 3/2004 | Green |
| 7,310,355 | B1 | 12/2007 | Krein et al. | 2004/0054771 A1 | 3/2004 | Roe et al. |
| 7,360,233 | B2 | 4/2008 | Russ et al. | 2004/0064714 A1 | 4/2004 | Carr |
| 7,360,235 | B2 | 4/2008 | Davies et al. | 2004/0068739 A1 | 4/2004 | Russ et al. |
| 2001/0005906 | A1 | 6/2001 | Humpleman | 2004/0068747 A1 | 4/2004 | Robertson et al. |
| 2001/0017920 | A1 | 8/2001 | Son et al. | 2004/0068754 A1 | 4/2004 | Russ |
| 2001/0030664 | A1 | 10/2001 | Shulman et al. | 2004/0078825 A1 | 4/2004 | Murphy |
| 2001/0039660 | A1 | 11/2001 | Vasilevsky et al. | 2004/0107445 A1 | 6/2004 | Amit |
| 2002/0002707 | A1 | 1/2002 | Ekel et al. | 2004/0109497 A1 | 6/2004 | Koval |
| 2002/0007485 | A1 | 1/2002 | Rodriguez et al. | 2004/0128681 A1 | 7/2004 | Hancock et al. |
| 2002/0010936 | A1 | 1/2002 | Adam | 2004/0128682 A1 | 7/2004 | Liga et al. |
| 2002/0019984 | A1 | 2/2002 | Rakib | 2004/0172658 A1 | 9/2004 | Rakib et al. |
| 2002/0035726 | A1 | 3/2002 | Corl | 2004/0177381 A1 | 9/2004 | Kliger et al. |
| 2002/0035729 | A1 | 3/2002 | Diep | 2004/0221304 A1 | 11/2004 | Sparrell et al. |
| 2002/0040475 | A1 | 4/2002 | Yap et al. | 2004/0255326 A1 | 12/2004 | Hicks, III et al. |
| 2002/0051200 | A1 | 5/2002 | Chang et al. | 2004/0257976 A1 | 12/2004 | Alsobrook et al. |
| 2002/0051581 | A1 | 5/2002 | Takeuchi et al. | 2004/0261126 A1 | 12/2004 | Addington et al. |
| 2002/0056112 | A1 | 5/2002 | Dureau et al. | 2005/0022248 A1 | 1/2005 | Robertson et al. |
| 2002/0059615 | A1 | 5/2002 | Okawara et al. | 2005/0028190 A1 | 2/2005 | Rodriguez et al. |
| 2002/0059617 | A1 | 5/2002 | Terakado et al. | 2005/0028208 A1 | 2/2005 | Ellis et al. |
| 2002/0059637 | A1 | 5/2002 | Rakib | 2005/0042999 A1 | 2/2005 | Rappaport |
| 2002/0066101 | A1 | 5/2002 | Gordon et al. | 2005/0044762 A1 | 3/2005 | Atluri |
| 2002/0067437 | A1 | 6/2002 | Tsubouchi et al. | 2005/0050557 A1 | 3/2005 | Gabryjelski et al. |
| 2002/0069417 | A1 | 6/2002 | Kliger et al. | 2005/0063422 A1 | 3/2005 | Lazar et al. |
| 2002/0083438 | A1 | 6/2002 | So et al. | 2005/0155052 A1 | 7/2005 | Ostrowska et al. |
| 2002/0087996 | A1 | 7/2002 | Bi et al. | 2005/0235323 A1 | 10/2005 | Ellis et al. |
| 2002/0090198 | A1 | 7/2002 | Rosenberg et al. | 2005/0251827 A1 | 11/2005 | Ellis et al. |
| 2002/0095673 | A1 | 7/2002 | Leung et al. | 2005/0262542 A1 | 11/2005 | DeWeese et al. |
| 2002/0095689 | A1 | 7/2002 | Novak | 2006/0069645 A1 | 3/2006 | Chen et al. |
| 2002/0100041 | A1 | 7/2002 | Rosenberg et al. | 2006/0218591 A1 | 9/2006 | Billmaier et al. |
| 2002/0104001 | A1 | 8/2002 | Lotspiech et al. | 2006/0259584 A1 | 11/2006 | Watson et al. |
| 2002/0108121 | A1 | 8/2002 | Alao et al. | | | |
| 2002/0116626 | A1 | 8/2002 | Wood | | FOREIGN PATENT DOCUMENTS | |
| 2002/0133558 | A1 | 9/2002 | Fenno et al. | EP | 0912054 A2 | 4/1999 |
| 2002/0137517 | A1 | 9/2002 | Williams et al. | EP | 0989557 A1 | 3/2000 |
| 2002/0141582 | A1 | 10/2002 | Kocher et al. | EP | 1028551 A2 | 8/2000 |
| 2002/0144262 | A1 | 10/2002 | Plotnick et al. | EP | 1117214 A2 | 7/2001 |
| 2002/0146237 | A1 | 10/2002 | Safadi | EP | 1175087 A2 | 1/2002 |
| 2002/0154892 | A1 | 10/2002 | Hoshen et al. | EP | 1213919 A2 | 6/2002 |
| 2002/0157112 | A1 | 10/2002 | Kuhn | EP | 1443766 A2 | 8/2004 |
| 2002/0166124 | A1 | 11/2002 | Gurantz et al. | EP | 1463324 A1 | 9/2004 |
| 2002/0174444 | A1 | 11/2002 | Gatto et al. | WO | 9525402 | 9/1995 |
| 2002/0178445 | A1 | 11/2002 | Eldering et al. | WO | 9826584 | 6/1998 |
| 2002/0187779 | A1 | 12/2002 | Freeny, Jr. | WO | 9837648 | 8/1998 |
| 2002/0194596 | A1 | 12/2002 | Srivastava | WO | 9901984 | 1/1999 |
| 2003/0005300 | A1 | 1/2003 | Noble et al. | WO | 9935844 | 7/1999 |
| 2003/0009763 | A1 | 1/2003 | Crinon et al. | WO | 9965244 | 12/1999 |
| 2003/0026423 | A1 | 2/2003 | Unger et al. | WO | 0035201 | 6/2000 |
| 2003/0028886 | A1 | 2/2003 | Wang et al. | WO | 0147234 A1 | 6/2001 |
| 2003/0028890 | A1 | 2/2003 | Swart et al. | WO | 0156286 A1 | 8/2001 |
| 2003/0044165 | A1 | 3/2003 | Wood et al. | WO | 0174003 A1 | 10/2001 |
| 2003/0063003 | A1 | 4/2003 | Bero et al. | WO | 0186948 A2 | 11/2001 |
| 2003/0063814 | A1 | 4/2003 | Herley | WO | 0211418 A2 | 2/2002 |
| 2003/0097563 | A1 | 5/2003 | Moroney et al. | WO | 0211446 A2 | 2/2002 |
| 2003/0108199 | A1 | 6/2003 | Pinder et al. | WO | 0217642 A2 | 2/2002 |
| 2003/0108336 | A1 | 6/2003 | Schramel | WO | 02097997 A2 | 12/2002 |
| 2003/0142664 | A1 | 7/2003 | Gerszberg et al. | WO | 03032620 A2 | 4/2003 |
| 2003/0145336 | A1 | 7/2003 | Matsuzaki et al. | WO | 03039154 A1 | 5/2003 |
| 2003/0149986 | A1 | 8/2003 | Mayfield et al. | WO | 2004023717 A3 | 3/2004 |
| 2003/0149991 | A1 | 8/2003 | Reidhead et al. | WO | 2004032514 A1 | 4/2004 |
| 2003/0159140 | A1 | 8/2003 | Candelore | WO | 2004036808 A2 | 4/2004 |
| 2003/0159157 | A1 | 8/2003 | Chan | WO | 2004036892 A2 | 4/2004 |
| | | | | WO | 2004098190 A1 | 11/2004 |

OPTIMIZATION OF A FULL DUPLEX WIDEBAND COMMUNICATIONS SYSTEM

RELATED APPLICATIONS

This application is a continuation of pending U.S. patent application Ser. No. 10/923,948 filed Aug. 23, 2004, which is a continuation-in-part of U.S. patent application Ser. No. 10/342,670 filed Jan. 15, 2003, the entireties of which are incorporated herein by reference.

FIELD OF THE INVENTION

This invention relates in general to broadband communications systems, and more particularly, to the field of a full duplex wideband communications system operating within a local coaxial network.

DESCRIPTION OF THE RELATED ART

Subscriber premises receiving cable television or satellite service typically have a coaxial network for providing received signals to various rooms in the premises. The coaxial network typically connects set-top terminals (STT) for decoding the signals (e.g., cable or satellite television (CATV) signals) to a communications system. It will be appreciated that other equipment, such as cable modems and video recorders, to name a couple, can also be connected to the coaxial network. The transmitted signals may be, therefore, video/audio signal, telephony signals, or data signals.

Traditionally, an individual STT could not communicate with the other networked STTs; they were receiving devices that may have had the capability to transmit data to a headend facility in the system. As technology progressed, a server STT could communicate with a plurality of remote STTs in a network. This communication is desirable in that the server STT could share files or programs with the remote STTs upon command from the remote STT. By way of example, the server STT may contain storage media, such as hard disk drives, to store video programs. Accordingly, the networked remote STTs may want to view those stored programs. In this manner, upon request, the server STT can transmit a program to the requesting remote STT for viewing at that STT. Further information regarding a networked multimedia system that includes a server and remote STTs can be found in copending U.S. patent application Ser. No. 10/342,670 filed Jan. 15, 2003, the disclosure and teachings of which are hereby incorporated by reference.

A need exists, however, for systems and methods that improve upon communications among networked equipment in a subscriber premises.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENTS

Preferred embodiments of the invention can be understood in the context of a broadband communications system and a local network. Note, however, that the invention may be embodied in many different forms and should not be construed as limited to the embodiments set forth herein. For example, transmitted broadband signals include at least one of video/audio, telephony, data, or Internet Protocol (IP) signals, to name but a few. Devices included in the broadband communications system for receiving the transmitted broadband signals may include a set-top terminal (STT), a television, a consumer electronics device such as a DVD player/recorder, a computer, a personal digital assistant (PDA), or other type of electronics device. Furthermore, in accordance with the present invention all of these receiving devices may include a modem or be connected to a stand-alone modem for receiving high speed data. All examples given herein, therefore, are intended to be non-limiting and are provided in order to help clarify the description of the invention.

The present invention is directed towards a full duplex wideband communications device and system that are suitable for use in a coaxial network. The coaxial network is typically confined to a subscriber premises. It will be appreciated, however, that the network can also be used in a multi-unit dwelling, business, school, hotel, or hospital, among others. Advantageously, the present invention allows for full duplex wideband communications among STTs or modems that are connected in the coaxial network. The communications between any pair of STTs (e.g., a server STT and a remote STT or two remote STTs) are at data rates suitable for high definition video transmissions. The present invention also allows multiple STTs to share the network without interference with each other. Additionally, a STT, for example, the server STT, is capable of providing different content to different remote STTs concurrently. Furthermore, the communication between STTs and the reception of conventional CATV signals occur simultaneously without interference to the received CATV signals. As mentioned, the modem can be a standalone device that is connected to an STT and still utilize the full duplex wideband communications in accordance with the present invention.

Figure 1:
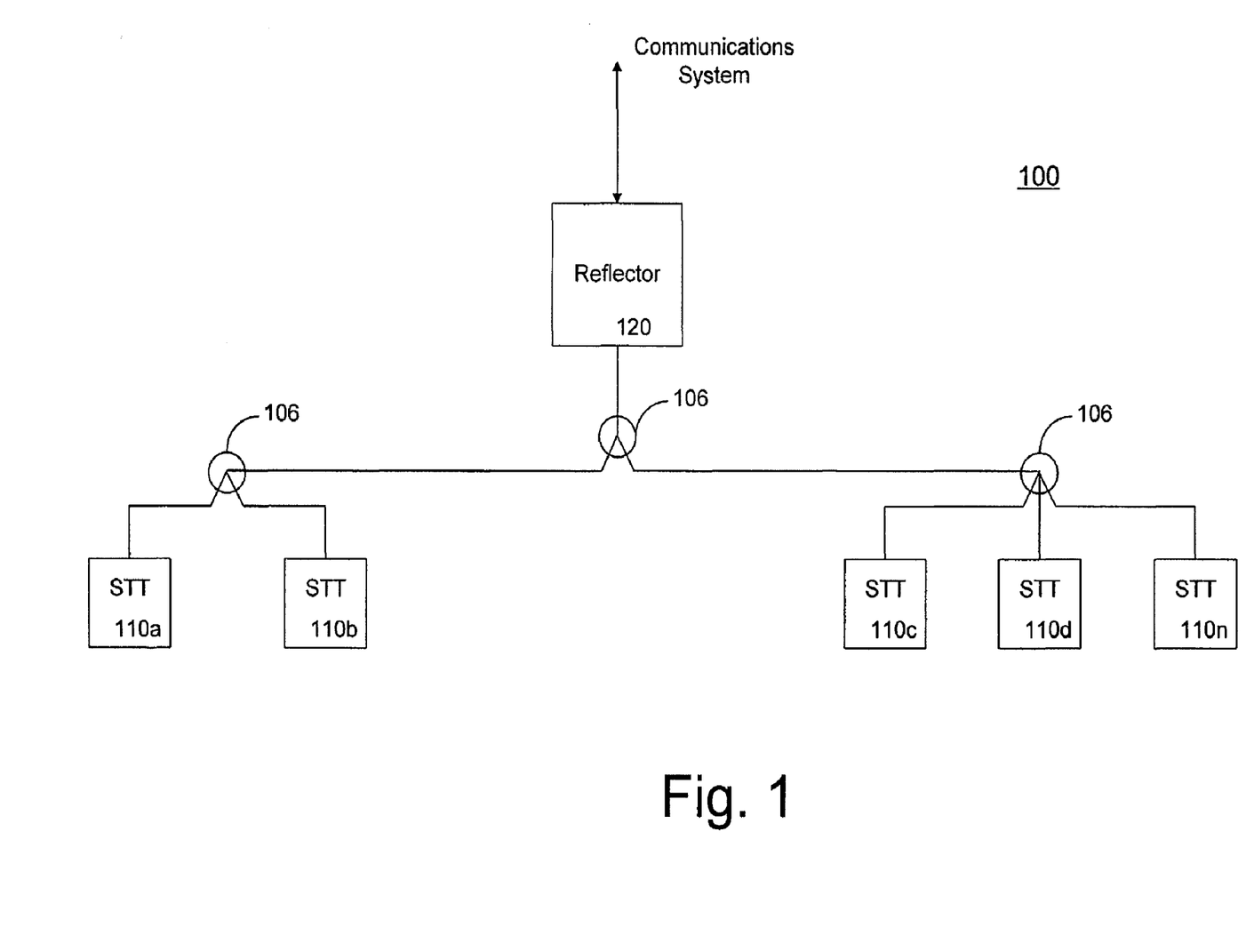
FIG. 1 illustrates a block diagram of a coaxial network 100 that includes a plurality of STTs for receiving and decoding CATV signals.

FIG. 1 illustrates a block diagram of a coaxial network 100 that includes coaxial cables 105 and power splitters 106. The coaxial network 100 is designed to connect set-top terminals (STTs) 110a-n within the premises to the CATV communications system. In the coaxial network, the STTs 110a-n (or other devices connected to the network 100) should preferably be able to communicate with each other. However, there is high loss between the STTs 110a-n due to port-port isolation of the splitters 106. To reduce the loss between the STTs 110a-n, a reflector 120 is inserted between the coaxial network 100 and the CATV communications system. The reflector 120 contains one or more band-reject filters that are centered on frequencies used to communicate between the STTs 110a-n. The filters reflect signals at these frequencies with low loss, so that the loss between STTs is minimized. Additionally, the band reject filters prevent the in-home signals from entering the CATV communications system. It will be appreciated that the block diagram of FIG. 1 can be reconfigured into several different configurations. For example, the splitters 106 can be incorporated into the reflector 120. Additionally, the reflector 120 shown operates using reflection of the signals, but other techniques could be used to reduce loss in the desired frequency bands. For example, it is possible to design a splitter that has reduced isolation in particular frequency bands, particularly in the modem's low band and high band. If this method were used, it would still be desirable to keep the coaxial network signals from leaking into the communications system. To reduce this leakage, an amplifier having sufficient reverse isolation could be placed in line with the cable from the communications system to the coaxial network. Further information regarding the reflector 120 can be found in copending U.S. patent application Ser. No. 10/342,670 filed Jan. 15, 2003, the disclosure and teachings of which are hereby incorporated by reference.

Figure 2:
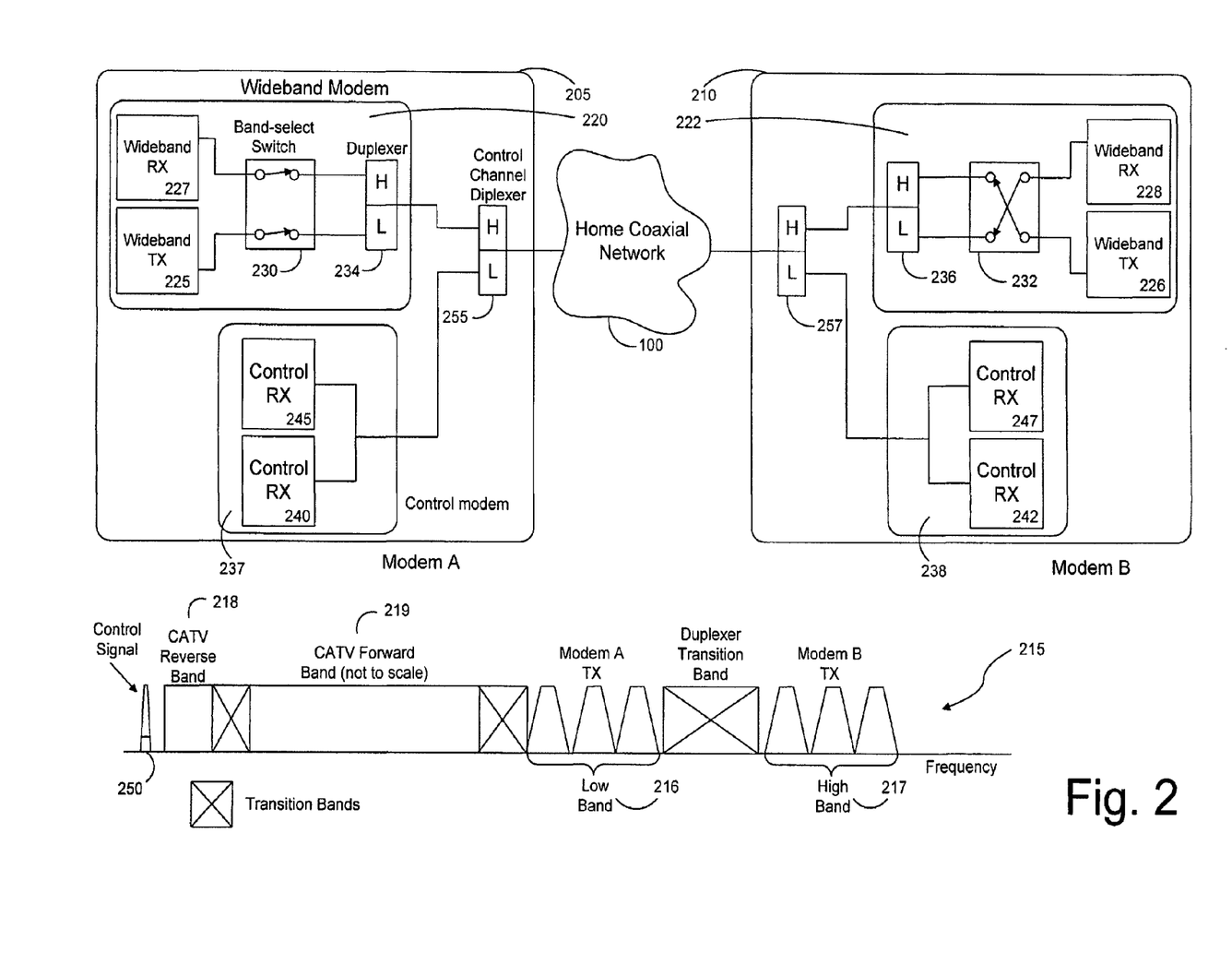
FIG. 2 illustrates a block diagram of two networked modems and a frequency range plan that are suitable for employing the full duplex wideband communications in accordance with the present invention.

FIG. 2 illustrates a block diagram of two networked modems 205, 210 and a frequency range plan 215 that are suitable for employing the full duplex wideband communications in accordance with the present invention. Two modems 205, 210 are shown connected to the coaxial network 100. Specifically, the modems 205, 210 communicate with each other, or other modems. In accordance with the present invention, the modems 205, 210 communicate in full duplex wideband mode. That is to say that modem A 205 may transmit signals in a low band 216 and modem B 210 may transmit in a high band 217 with each other. As will be discussed further below, the channel allocated to the modems 205, 210 may change. Only two modems 205, 210 are shown in this illustration; however, since several modems may be operating simultaneously in the coaxial network 100, there are preferably multiple wideband channels in bands 216 and 217 in the frequency range 215 to avoid conflict. Other signals transmitted in the frequency range 215 comprise a reverse band 218 from, for example, 5 MHz to 40 MHz that the STTs 110 use to communicate back to the headend facility in the system. Additionally, a forward band 219, ranging from 50 MHz to 870 MHz, carries several channels of downstream programs that are broadcasted from the headend facility to the STTs 110 throughout the system.

The modems 205, 210 each include a wideband modem 220, 222 comprising transmitters 225, 226 and receivers 227, 228 for high data rate communications, such as transmitting and receiving stored video presentations, within the coaxial network 100. The preferred modulation method for the wideband data communications is QAM (quadrature amplitude modulation), and typically the frequencies are above the forward band 219. The wideband modems 220, 222 also include a band-select switch 230, 232 and a duplexer 234, 236 for routing the wideband signals.

A medium access method is similar to frequency division multiple access with frequency division duplex (FDMA/FDD). FDMA/FDD is appropriate for systems having a base station and multiple users, such as cellular telephone. In the FDMA/FDD system, the base station transmits in a downlink band, and the users transmit in an uplink band. The receiver is isolated from the transmitter by a duplexer. In accordance with the present invention, however, coupled modems 205, 210, or STTs that include modems 205, 210, communicate directly with each other (e.g., from STT 110a to STT n) rather than the conventional method. In other words, there is no base station in the coaxial network 100. To allow any two wideband modems 205, 210 to communicate in this manner, however, the FDD scheme is no longer sufficient.

To allow the wideband modems 205, 210 to communicate in accordance with the present invention, the modems 205, 210 can transmit and receive in either of two bands (e.g., low band 216 and high band 217). The electronically-controlled band select switch 230, 232 allows reversing the connection of the transmitter 225, 226 and receiver 227, 228 to the duplexer 234, 236. As shown in FIG. 2, modem A 205 is set to transmit in the low band 216 and receive in the high band 217, and modem B 210 is set to transmit in the high band 217 and receive in the low band 216. Transmitting and receiving in a frequency included in either the high band or the low band can be optimized and is discussed further below. For either setting of the band select switch 230, 232, the duplexer 234, 236 attenuates the transmit signal so that the receiver sensitivity is not degraded by the transmitter (i.e., modem A's transmitter 225 does not affect modem A's receiver 227). Each band 216, 217 may contain multiple signals to allow multiple pairs of modems to communicate simultaneously. The transmitters 225, 226 and receivers 227, 228 need to be able to function over a frequency range that includes both the high and low bands. The switch 230, 232 should preferably be a monolithic double-pole double throw type. The duplexer 234, 236 should preferably use dielectric resonator technology, while the control channel diplexer 255, 257 is preferably an LC filter.

The modems 205, 210 also include a control modem 237, 238 comprising transmitters 240, 242 and receivers 245, 247 used for control communications among the modems 205, 210 within the coaxial network 100. More specifically, the control transmitter 240, 242 provides control information, such as an optimized transmitting frequency of the wideband modem, or requests, such as a request for a stored video presentation, to at least one control receiver 245, 247. The control receiver 245, 247 then receives the information or request and acts accordingly.

In contrast to the full duplex wideband modems 220, 222, the control modems 237, 238 operate on a single frequency and in half duplex mode. Additionally, the single frequency is separate from bands 216, 217 used by the wideband modems 220, 222. The control frequency 250 used by the control modem 237, 238 is typically below the reverse band 218, for example, at 4.5 MHz The control signals and the wideband data communications signals are routed to the coaxial network 100 using the control channel diplexer 255, 257.

The control modems 237, 238 send and receive data packets as burst packages using a modulation scheme such as FSK (frequency shift keying). Each packet includes an error-detection code and a destination address. The control modems 237, 238 use a random access protocol similar to ALOHA in a known manner. A protocol for control communications from, for example, modem A 237 to modem B 238 may be summarized as follows:

Modem A 237 sends a packet to modem B 238 and then waits for acknowledgement;

assuming modem B 238 receives the packet with no errors and the address is that of modem B 238, modem B 238 sends a short acknowledgement;

if the acknowledgement signal is received by modem A 237, then modem A 237 sends the next packet. If the acknowledgement signal is not received within a specified time, modem A 237 waits a random time and resends the initial packet.

Figure 3:
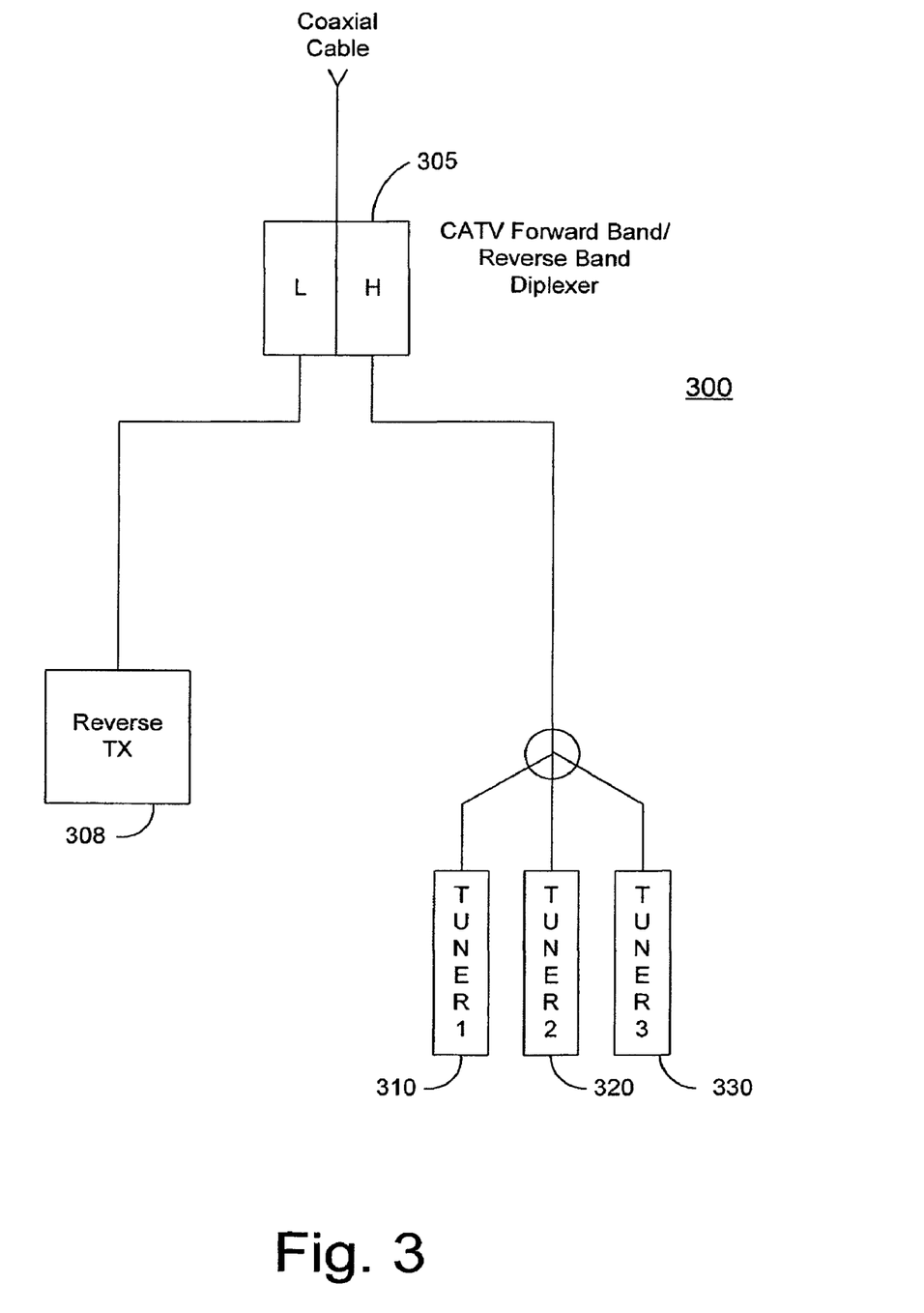
FIG. 3 illustrates a simplified block diagram of the RF portion of a set-top terminal.

FIG. 3 illustrates a simplified block diagram of a radio frequency (RF) portion of a set-top terminal (STT). STT 300 includes diplexer 305, which isolates tuners 310, 320, 330 from a reverse transmitter 308. The reverse transmitter 308 transmits signals to the headend facility in the communications system. Tuners 310, 320, 330 can be used to receive live television signals (CATV signals), record to a hard drive, or receive cable modem signals. The tuners 310, 320, 330 are capable of receiving QAM signals. Advantageously, a wideband modem 220, 222 that uses some of these existing STT functions can be added to the STT 300.

Figure 4:
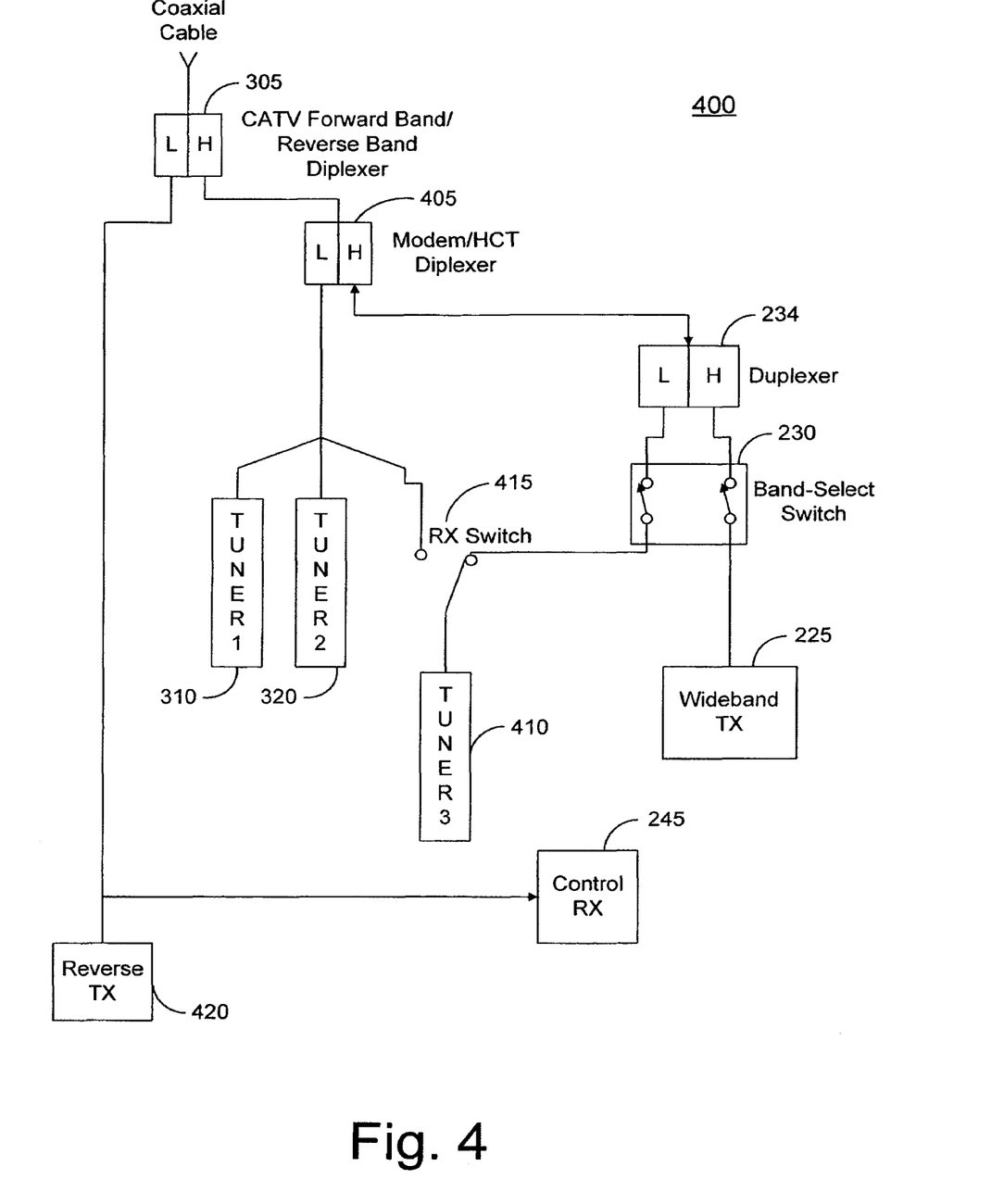
FIG. 4 illustrates a simplified STT including a wideband modem in accordance with the present invention.

FIG. 4 illustrates a simplified STT including a wideband modem in accordance with the present invention. CATV signals are received from the communications system at diplexer 305. Diplexer 405 provides the CATV signals and any modem RF signals to the intended destination depending upon the received signal frequency. In accordance with the present invention, tuner 410 can be configured to act as the wideband receiver 227 shown in FIG. 2, and switch 415 is added to select the appropriate signal path depending upon the type of received signals. Accordingly, switch 415 connects the tuner 410 to receive wideband communications signals from another modem 210. In the event that the STT 400 requires a third tuner to receive CATV signals, the switch 415 connects the tuner 410 to the communications system. The STT's reverse transmitter 420 may be shared between the CATV reverse band 218 and the control channel signals 250. The reverse transmitter 420 may be configured as an FSK transmitter.

Returning to FIG. 2, a communications protocol needs to be established between two modems. A simplified example of a protocol used by the initiating modem 205 and the receiving modem 210 follows assuming knowledge of unused frequencies and that it is arbitrarily chosen that modem A 205 transmits in the low band.

Modem A 205 sets the band switch to Tx/Rx=low/high; modem A 205 chooses from the unused frequencies low and high band frequencies ($f_L$ and $f_H$);

modem A 205 uses the control transmitter 240 to send the chosen frequency information to modem B 210;

modem B 210 sends an acknowledgement using control transmitter 242 and, based on the frequency chosen by modem A 205, sets the band switch 232 to Tx/Rx=high/low and tunes the wideband receiver 228 to the frequency in the low band ($f_L$);

modem A 205 then tunes its wideband receiver 227 to the frequency in the high band ($f_H$) and begins transmitting data at $f_L$;

modem B 210 begins transmitting at $f_H$; and modem A 205 uses control transmitter 240 to send a message to any other modems on the network indicating that the two chosen frequencies ($f_L$ and $f_H$) are currently in use.

Another embodiment of a full duplex communications modem for the coaxial network 100 is a client modem. A client modem includes a wideband receiver and a control transmitter. The client modem does not include a wideband transmitter or control receiver. In this manner, the client modem uses the control transmitter to request a wideband transmission from a server wideband modem and then receives the wideband transmission using its wideband receiver. A typical application for the client modem is to request and receive video programs stored in an STT that is connected to or containing the wideband communications modem 205.

As previously discussed, the modem signals are reflected and contained within the coaxial network 100 by filters within the reflector 120 (FIG. 1). In this manner, the loss between modems is minimized. However, referring to FIG. 1, the signal between modems may take several paths other than the path to and from the reflector 120. For example, there is a path between modems included in STT 110a and STT 110b across the splitter 130. The multiple signal paths (i.e., multipath environment) cause distortions to the frequency response of the coaxial network 100, which may include deep nulls 505 (FIG. 5).

Figure 5:
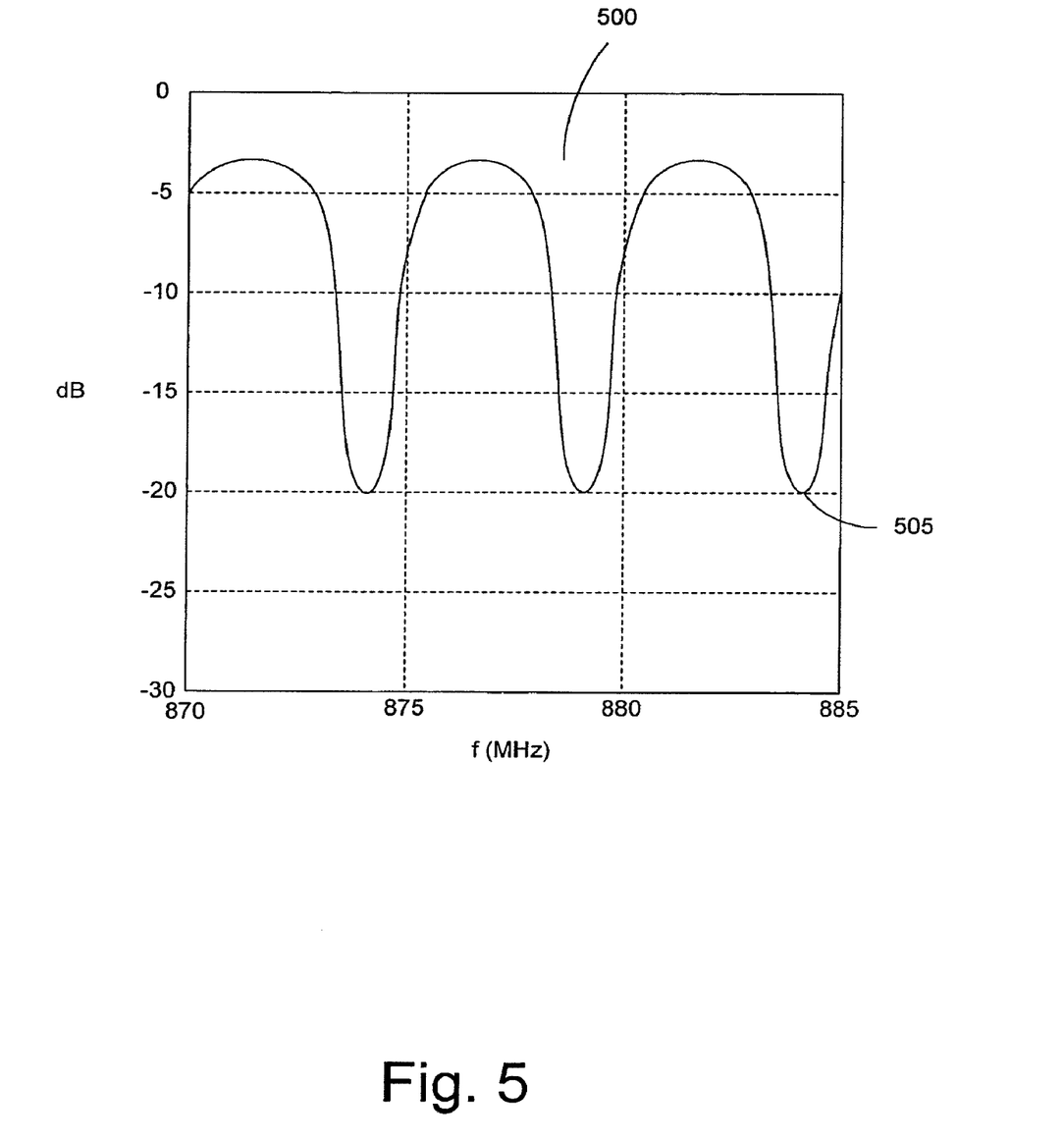
FIG. 5 is a graph illustrating a frequency response of a wideband modem in a coaxial network having a multipath environment.

FIG. 5 is a graph illustrating a frequency response 500 of a coaxial network 100 having a multipath environment. The frequency response 500 is within the full duplex wideband communications signal band. The control modem signal is not very susceptible to multipath distortion since its bandwidth is small and the modulation method is usually simple (e.g., FSK).

The present invention includes methods to optimize communication between wideband modems in a multipath environment. The methods involve optimizing the QAM signal parameters based on RF center frequency; bandwidth; and QAM constellation. The last two parameters affect the maximum data rate of the channel. When two modems 205, 210 connect for the first time, a search algorithm can be used to determine the best signal parameters for each direction of communication. For example, using an FSK signal in the control channel, modem A 205 can request modem B 210 to transmit at a given frequency. Modem A 205 can then store the signal quality at that frequency received from modem B 210. This is repeated at several frequencies until the data rate for all of the frequencies are determined. An example of a possible search sequence is shown in Table 1. Once the optimal signal parameters are found, those parameters are stored by both modems 205, 210 so that the search algorithm need not be repeated. Signal quality is determined from measurements made by the receiving modem, including one or more of the following: signal amplitude, constellation SNR (signal to noise ratio); tap values of the adaptive equalizer, and bit error rate.

TABLE 1

Example of Search Sequence for Optimal Transmit Signal Parameters

| Parameter Set | Center Frequency | Bandwidth (MHz) | Constellation | Data Rate |
|---|---|---|---|---|
| 1 | 873 | 6 | 256 | Highest |
| 2 | 874 | 6 | 256 | Highest |
| 3 | 875 | 6 | 256 | Highest |
| 4 | 876 | 6 | 256 | Highest |
| 5 | 877 | 6 | 256 | Highest |
| 6 | 878 | 6 | 256 | Highest |
| 7 | 879 | 6 | 256 | Highest |
| 8 | 873 | 6 | 64 | |
| 9 | 874 | 6 | 64 | |
| 10 | 876 | 6 | 64 | |
| 11 | 877 | 6 | 64 | |
| 12 | 878 | 6 | 64 | |
| 13 | 879 | 6 | 64 | |
| 14 | 879 | 6 | 64 | |
| 15 | 873 | 3 | 256 | |
| 16 | 874 | 3 | 256 | |
| 17 | 875 | 3 | 256 | |
| 18 | 876 | 3 | 256 | |
| 19 | 877 | 3 | 256 | |
| 20 | 878 | 3 | 256 | |
| 21 | 879 | 3 | 256 | |
| 22 | 873 | 3 | 64 | Lowest |
| 23 | 874 | 3 | 64 | Lowest |
| 24 | 875 | 3 | 64 | Lowest |
| 25 | 876 | 3 | 64 | Lowest |
| 26 | 877 | 3 | 64 | Lowest |
| 27 | 878 | 3 | 64 | Lowest |
| 28 | 879 | 3 | 64 | Lowest |

If there are several modems connected to the coaxial network 100, for example, one server modem and several client modems, the server modem may have to transmit to two or more client modems simultaneously. Considering a two-client example, it may happen that, due to multipath distortion, the frequency responses from server modem 110a to client modems 110b and 110d are not similar. In this case, the optimization of the signal parameters should take both frequency responses into account. On initial connection, each client modem performs the search algorithm described hereinabove. An integer quality score based on signal measurements is assigned to each parameter set of Table 1, with 7 equal to the highest quality. Any score above 0 indicates an acceptable quality. The signal parameter table for client modems 110b and 110d is stored in the server modem 110a. Therefore, the server modem 110a can sort the tables to find the highest scores for each client modem 110b-n. By way of example, the overall score could be calculated as: overall score=min(client 110b score, client 110d score). The result might appear as shown in Table 2. For this example, parameter set i is optimal.

TABLE 2

Example of Sorted Signal Quality Scores

| | Score | | | |
|---|---|---|---|---|
| Parameter Set | Client Modem 110b | Client Modem 110d | Overall Score | Data Rate |
| i | 4 | 3 | 3 | Medium |
| j | 6 | 3 | 3 | Lowest |
| k | 5 | 2 | 2 | Medium |
| m | 0 | 2 | 0 | Highest |
| n | 2 | 0 | 0 | Highest |
| Etc. | Etc. | Etc. | Etc. | Etc. |

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the preferred embodiments of the invention in logic embodied in hardware and/or software-configured mediums.

What is claimed is:

1. A system for optimal transmission of high data rate signals among a plurality of full duplex wideband modems, the system comprising:
   a first wideband modem configured to transmit high data rate signals in a first optimized frequency, wherein prior to transmitting the high data rate signals, an optimization protocol is performed using control signals, and configured to receive high data rate signals in a second optimized frequency; and
   a second wideband modem configured to receive the high data rate signals in the first optimized frequency, wherein each wideband modem comprises:
      a transmitter configured to transmit high data rate signals;
      a receiver configured to receive high data rate signals;
      a band select switch coupled on one end to the transmitter and the receiver configured to select one of a high band or a low band in accordance with the first optimized frequency, and coupled on another end to a network, wherein if the first optimized frequency is associated with one of the high band or the low band, received high data rate signals in a second optimized frequency is associated with the other band;
      a control transmitter, that transmits on a third frequency, configured to send control information to the second wideband modem, wherein the third frequency is outside a frequency band of the high and the low bands; and
      a control receiver, that receives on the third frequency, configured to receive control information indicating the optimized frequencies.

2. The system of claim 1, wherein each wideband modem further comprises a duplexer configured to combine the first optimized frequency and the second optimized frequency, wherein the duplexer is coupled to the band select switch and the network.

3. A coaxial network for communicating a video presentation, the coaxial network comprising:
   a plurality of wideband modems configured to transmit and receive video presentation over a coaxial network in an optimized frequency to one or more of the plurality of wideband modems, wherein prior to transmitting video presentation, an optimization protocol is performed using control information to determine the optimized frequency, a wideband modem comprising:
      a transmitter configured to transmit video presentation;
      a receiver configured to receive video presentation;
      a band select switch coupled on one end to the transmitter and the receiver configured to select one of a high band or a low band in accordance with the optimized frequency associated with the transmitted video presentation, and coupled on another end to the coaxial network;
      a control transmitter, that transmits on a second frequency, configured to send control information to another of the plurality of wideband modems and the control information includes information regarding the optimized frequency, wherein the second frequency is outside a frequency band of the high and the low bands; and
      a control receiver, that receives on the second frequency, configured to receive control information from at least one of the plurality of wideband modems.

4. The coaxial network of claim 3, wherein the plurality of wideband modems further comprise a duplexer operably connected on one end to both the transmitter and receiver.

5. A coaxial network for communicating a video presentation between a first set-top terminal and a second set-top terminal that are each located at a subscriber premises, the coaxial network comprising:
   a first set-top terminal including a wideband modem configured to transmit and receive video presentation over the coaxial network in an optimized frequency to a second set-top terminal including a wideband modem, wherein prior to transmitting video presentation, an optimization protocol is performed using control signals to determine the optimized frequency, the wideband modems each comprising:
      a transmitter configured to transmit video presentation;
      a receiver configured to receive video presentation;
      a band select switch coupled on one end to the transmitter and the receiver configured to select one of a high band or a low band in accordance with the optimized frequency associated with the transmitted video presentation, and coupled on another end to the coaxial network;
      a control transmitter, that transmits on a second frequency, configured to send control information to the other wideband modem and the control information includes information regarding the optimized frequency, wherein the second frequency is outside a frequency band of the high and the low bands; and a control receiver, that receives on the second frequency, configured to receive control information from the other wideband modem, wherein a cable television (CATV) forward band and reverse band separate the optimized frequency from the second frequency.

6. The coaxial network of claim 5, wherein the wideband modems further comprise a duplexer operably connected on one end to both the transmitter and receiver.

* * * * *